Patented Apr. 20, 1943

2,317,309

UNITED STATES PATENT OFFICE 2,317,309

DOUBLE SALTS OF FERROUS SALTS AND PYRIDINE CARBOXYLIC ACID AMIDE

Hans Stenzl, Basel, Switzerland, assignor to the firm J. R. Geigy A. G., Basel, Switzerland No Drawing. Application November 19, 1941, Serial No. 419,803. In Switzerland August 24, 1940

3 Claims. (Cl. 260—270)

It has been found that pyridine carboxylic acid amides and their derivatives react with ferrous salts to form vivid colored double compounds which mostly are more difficultly soluble than the components and crystallise excellently. They are durable, particularly in dry form and are suitable for therapeutical purposes.

The present invention is illustrated by the following examples. The parts indicated therein are by weight, unless otherwise stated.

Example 1

To a solution of 9.82 parts of ferrous sulfate in 10 parts of hot water there are added 4.46 parts of nicotinic acid amide, dissolved in 3 parts of hot water.

The solution assumes an intensive straw-yellow color and on cooling 12 parts of the double compound of the formula $FeSO_4.C_6H_6ON_2.6H_2O$ crystallise out in the form of yellow laminae. It dissolves at 25° C. in about 8 parts of water.

Example 2

9.82 parts of ferrous sulfate are rubbed intimately with 4.46 parts of nicotinic acid amide, the mixture is moistened with a little alcohol and allowed to stand for some time. The combination of the components occurs with a coloration towards yellow.

Example 3

4 parts of ferrous chloride are dissolved in 8 parts of hot water and 2.5 parts of nicotinic acid amide are added. The double compound separates almost immediately in the form of yellow needles. It has the formula $FeCl_2.C_6H_6ON_2.3H_2O$.

As carboxylic acid amides there are further suitable for example other amides of pyridine-3-carboxylic acid than pyridine-3-carboxylic acid amide such as pyridine-3-carboxylic acid-methylamide, pyridine-3-carboxylic acid-diethyl amide, pyridine-3-carboxylic-acid-oxyethyl amide and so forth. Amides of other pyridine-carboxylic acids also yield with ferrous salts, similar double compounds, amongst which may be mentioned the amides of pyridine-2-carboxylic acid, pyridine-2:3-dicarboxylic acid, pyridine-2-carboxylic acid ester-3-carboxylic acid, pyridine-3:4-dicarboxylic acid, 6-aminopyridine-3-carboxylic acid, pyridone-3-carboxylic acid, alkoxypyridine-carboxylic acids, such as 2:6-dialkoxy pyridine-4-carboxylic acids, 2:6-dicycloalkoxy pyridine-4-carboxylic acids and many others.

Example 4

To 3.75 parts of pyridine-β-carboxylic acid diethylamide dissolved in 15 parts by volume of water there are added 5.9 parts of ferrous sulfate which is at once dissolved. The intensive green-yellow coloration of the solution thus obtained indicates the formation of the double compound. By evaporating in vacuo the said double compound is obtained in form of yellow, very easily water-soluble crystals.

Instead of ferrous sulfate there may also be used ferrous lactate.

What I claim is:
1. A double-salt of a ferrous salt and a pyridine-carboxylic acid amide, prepared for use as a therapeutic.
2. A double-salt of 1 mol of ferrous sulfate and 1 mol of nicotinic acid amide, prepared for use as a therapeutic.
3. A double-salt of 1 mol of ferrous chloride and 1 mol of nicotinic acid amide, prepared for use as a therapeutic.

HANS STENZL.